United States Patent Office 3,307,952

Patented Mar. 7, 1967

3,307,952

FORMATION OF DIAZO COUPLERS IN SITU

Claude M. Aebi, Endicott, and Leon A. Teuscher, Rochester, N.Y., assignors to International Business Machines Corporation, New York, N.Y., a corporation of New York No Drawing. Filed Nov. 20, 1963, Ser. No. 325,171
6 Claims. (Cl. 96—91)

The present invention relates to a light sensitive, heat developable diazonium composition and to elements including such a composition. More specifically, this invention relates to diazonium compositions and products which may be developed by heat without the application of any discrete developer and which are characterized by the in situ formation of the diazonium couplers.

The diazo compositions most widely employed in conventional diazo coatings comprise a light decomposable diazonium salt, an organic coupling component and an acid. An element coated with this composition is exposed to light through a negative or positive and the diazonium salt is decomposed only in the areas exposed to light. The unexposed areas remain undecomposed and are subject to further reaction in the presence of an alkaline reagent to produce a colored image with the coupler. The reactivity of the diazonium salt in the exposed areas is destroyed. The alkaline material for promoting the reaction is generally ammonia, applied either as a gas or in solution.

The conventional diazo color-forming reaction proceeds in an alkaline environment, but is inhibited if the combined ingredients are present in an acid medium. Consequently, when the pH of the diazo system is adjusted from an acid level to seven or higher, the coupler and diazo ordinarily will react to form visible images. This principle has been used in the manufacture of conventional light sensitive papers that have limited shelf life under high humidity and temperature conditions. Besides this limited storage or shelf life, known papers generally must be developed by the application of a separate alkaline medium, such as ammonia. The alkaline medium usually produces noxious by-product vapors that have to be evacuated. Furthermore, a relatively complex apparatus is required for use in conjunction with such copying papers. Such devices usually must include means for storing, generating, and/or applying developing fluids and for evacuating noxious by-product vapors.

The main object of this invention is to overcome the above-noted difficulties of the prior art and, more specifically, to provide a diazo composition which may be employed in relatively simple azo copying devices wherein no means for generating developing fluids or evacuating noxious by-product vapors need be provided.

Another object of this invention is to provide a light sensitive diazonium composition that is developable by heat.

Another object of this invention is the provision of a diazonium composition which may be employed as a coating or as several coatings on various substrates to produce highly useful photosensitive copying means.

Another very important object of this invention is to provide heat developable diazo papers that have improved shelf life under conditions of high humidity and temperature.

The disadvantages attending the use of conventional diazo copying materials are overcome according to the present invention by providing a composition capable of in situ formation of a diazo coupler under the application of heat or upon heating in the presence of a dehydrating agent. More specifically, the present invention provides for the formation of an unsaturated $\beta,\beta'$, unsaturated ketone diazo coupler by heating and dehydrating a $\beta,\beta'$ keto alcohol. The invention also contemplates the use of a dehydrating agent to lower the temperature at which the unsaturated ketone coupling compound is formed.

The invention further contemplates light sensitive diazonium compositions and elements comprising $\beta,\beta'$ keto alcohols and a compound which generates a base upon heating.

Alternatively, the composition may not contain a base generating compound where the composition contains an acid which is volatilized on heating, such as trichloroacetic acid or an acid which is transformed to an anhydride on heating, such as maleic, phthalic or malonic acids. A base generating compound will also be unnecessary where the composition is formulated without an acid.

The following examples illustrate preferred embodiments of the present invention and also will aid a better understanding of the invention.

EXAMPLE 1

The following ingredients are dissolved in 50 ml. of a 15% solution of cellulose acetate butyrate in ethanol, viscosity half second:

| | Grams |
|---|---|
| 1,5-diphenyl-3-pentenol-1,5-dione | 5 |
| p-Diazo diethyl aniline zinc chloride salt | 2 |
| Cyanoguanidine | 3 |
| 1,3,6-trisodium naphthalene sulfonate | .5 |
| Zinc chloride | .05 |

The solution is coated on a paper substrate, dried and exposed under an original to ultraviolet light (3200 A. to 4500 A.) for from 10 to 30 seconds. Development of a good yellow-brown image is obtained by heating the exposed sheet at a temperature in the range of from about 100° C. to 180° C. for from 5 to 60 seconds.

EXAMPLE 2

The following ingredients are dissolved in 50 ml. of a 10% solution of polyvinyl butyral in methanol:

| | Grams |
|---|---|
| 1,3,5-triphenyl-3-pentenol-1,5-dione | 5 |
| p-Diazo, 2,5-diethoxy-1-morpholino benzene, half zinc chloride | 2 |
| Cyanoguanidine | 1 |
| Thiourea | 2 |
| Tartaric acid | .5 |
| Succinic anhydride | 2 |

After coating on a substrate, drying, exposure and development, as in Example 1, a dark purple-brown image is obtained.

It will be apparent that various substrates, and film-forming carriers can be employed in producing the light sensitive elements of the present invention.

In addition to paper, various porous or non-porous substrates are within the scope of the invention, such as cloth, composition board, glass, metal, plastic films, etc.

The following are various non-limiting examples of resinous or film-forming materials that can be used as vehicles for the light-sensitive diazonium compositions of the present invention: cellulose esters, polyvinyl chloride, polyvinylidene chloride, polyvinyl alcohol, various acrylates and methacrylates, etc.

In general, the present compositions may comprise from an effective minimum up to about 10% by weight of a light-sensitive diazonium compound and up to about 20% by weight of the $\beta,\beta'$ diketo alcohol which generates a coupler upon heating. Any of the commonly known light sensitive diazonium salts which couple with the dehydration reaction product of the $\beta,\beta'$ diketo alcohol may be satisfactorily employed.

Representative examples of light sensitive diazonium compounds within the scope of the present invention include the following:

p-diazo dimethyl aniline zinc chloride
p-diazo diethyl aniline zinc chloride
p-diazo ethyl-hydroxyethyl aniline ½ zinc chloride
p-diazo 2,5-diethoxy-benzoylaniline ½ zinc chloride
p-diazo ethyl-benzylaniline ½ zinc chloride
p-diazo 1 morpholinobenzene ½ zinc chloride
p-diazo 2,5-dibutoxy 1 morpholinobenzene ½ zinc chloride
p-diazo 2,5-diethoxy 1 morpholinobenzene ½ zinc chloride
p-diazo N ethyl-O toluidine zinc chloride, etc.

Any combination of the above are to be considered diazonium salts within the scope of this invention.

Where a dehydrating agent is employed in the composition to aid the formation of the coupler, it ordinarily may be present in an amount up to about 15% by weight of the composition.

The balance of the composition ordinarily comprises a substantial amount of a film-forming material perhaps in an amount of about 50% by weight or more.

Acid stabilizers, antioxidants, base generators and the like may also be present in small amounts.

Suitable compounds which decompose on heating to generate a base comprise urea, guanidine salts, hexamethylene tetramine, cyanoguanidine, etc.

Suitable dehydrating agents for use in the present composition to promote rapid coupler formation include, for example, cyanoguanidine, and anhydrides of weak acids such as itaconic, succinic, citraconic acid, etc.

Some dehydrating agents may also function as base generators which are activated in response to heat. Cyanoguanidine and its derivatives function in this manner.

The mechanism by which the $\beta,\beta'$ diketo alcohols are converted to the unsaturated coupling components containing active methylene groups is illustrated in the following general reaction:

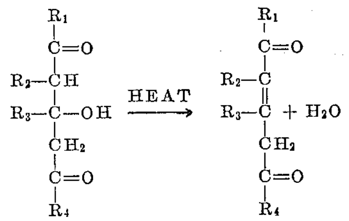

In the above formulae, substituents $R_1$, $R_2$, $R_3$ and $R_4$ may be selected from the group consisting of hydrogen and alkyl or aryl radicals. The substituents themselves, of course, should not undergo coupling with the light sensitive diazonium salt and groups $R_2$ and $R_3$ should be selected to permit easy dehydration on heating.

While the invention has been particularly shown and described with reference to preferred embodiments thereof, it will be understood by those skilled in the art that various changes in form and details may be made therein without departing from the spirit and scope of the invention.

What is claimed is:

1. A composition of matter comprising a light-sensitive diazonium compound and 1,5-diphenyl-3-pentanol-1,5-dione.

2. A composition of matter as in claim 1, comprising in addition a dehydrating agent.

3. A composition of matter as in claim 1, comprising in addition a base generator.

4. A composition of matter as in claim 1, comprising in addition cyanoguanidine.

5. A composition as in claim 1 wherein said base generator becomes reactive upon heating to produce basic products and said 1,5-diphenyl-3-pentenol-1,5-dione reacts upon heating to form a dehydration product which is a coupling component for said light-sensitive diazonium compound.

6. A light-sensitive element comprising a substrate coated with a layer comprising the composition of claim 1.

References Cited by the Examiner

UNITED STATES PATENTS

| | | | |
|---|---|---|---|
| 2,531,091 | 11/1950 | Van Dormael | 96—91 X |
| 2,574,500 | 11/1951 | Schechter et al. | 260—594 X |
| 3,052,542 | 9/1962 | Sulich | 96—91 X |
| 3,154,417 | 10/1964 | Aebi et al. | 96—75 |

NORMAN G. TORCHIN, *Primary Examiner.*

ALEXANDER D. RICCI, *Examiner.*

C. L. BOWERS, *Assistant Examiner.*